US006857066B2

(12) United States Patent
Bigbee et al.

(10) Patent No.: US 6,857,066 B2
(45) Date of Patent: Feb. 15, 2005

(54) APPARATUS AND METHOD TO IDENTIFY THE MAXIMUM OPERATING FREQUENCY OF A PROCESSOR

(75) Inventors: Bryant E. Bigbee, Scottsdale, AZ (US); Shivnandan Kaushik, Portland, OR (US); Frank Binns, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 478 days.

(21) Appl. No.: 09/990,899

(22) Filed: Nov. 16, 2001

(65) Prior Publication Data

US 2003/0097602 A1 May 22, 2003

(51) Int. Cl.$^7$ .................................................. G06F 1/04
(52) U.S. Cl. .......................... 713/1; 713/500; 713/501; 710/8
(58) Field of Search ........................... 713/1, 500, 501; 710/8

(56) References Cited

U.S. PATENT DOCUMENTS

| | | | | | |
|---|---|---|---|---|---|
| 4,677,433 | A | * | 6/1987 | Catlin et al. | 340/825.2 |
| 6,065,131 | A | * | 5/2000 | Andrews et al. | 713/600 |
| 6,668,318 | B1 | * | 12/2003 | Jenkins et al. | 713/1 |
| 2003/0182545 | A1 | * | 9/2003 | Chalmers et al. | 713/1 |

* cited by examiner

*Primary Examiner*—Rehana Perveen
(74) *Attorney, Agent, or Firm*—Blakely, Sokoloff, Taylor & Zafman LLP

(57) ABSTRACT

A method and apparatus comprising setting a register to a value executing a processing instruction to interpret the value and the at least one register verifying that the interpretation of the processing instruction is valid to ensure the at least one register contains a valid at least one string scanning the string in the register for multiplier scanning the string in the register for a frequency and determining a maximum operating frequency with the multiplier and frequency.

30 Claims, 6 Drawing Sheets

| | Function | Return Value |
|---|---|---|
| EAX input value | | |
| 80000000h | Largest Extended Function Supported | EAX=80000004; EBX = ECX = EDX = 0 |
| 80000001h | Extended Processor Signature and Extended Feature Bits | EAX = EBX = ECX = EDX = 0 |
| 80000002h | Processor Brand String | EAX, EBX, ECX, EDX, contain ASCII brand string |
| 80000003h | Processor Brand String | EAX, EBX, ECX, EDX, contain ASCII brand string |
| 80000004h | Processor Brand String | EAX, EBX, ECX, EDX, contain ASCII brand string | column 502, column 504, column 506
row 508, row 510, row 512, row 514, row 516

FIG. 5

| EAX input value | Function | Return Value |
|---|---|---|
| 80000000h | Largest Extended Function Supported | EAX=80000004; EBX = ECX = EDX = 0 |
| 80000001h | Extended Processor Signature and Extended Feature Bits | EAX = EBX = ECX = EDX = 0 |
| 80000002h | Processor Name | EAX = 0x20202020(" ");<br>EBX = 0x20202020(" ");<br>ECX = 0x20202020(" ");<br>EDX = 0x6E492020(" nI") |
| 80000003h | Processor Name | EAX = 0x286C6574("(let");<br>EBX = 0x50202952(") P "); <br>ECX = 0x69746E65("itne");<br>EDX = 0x52286D75("R(mu") |
| 80000004h | Processor Name | EAX = 0x20342029(" 4 )");<br>EBX = 0x20555043(" UPC");<br>ECX = 0x30303431("0041");<br>EDX = 0x007a484d("\0zHM") |

APPARATUS AND METHOD TO IDENTIFY THE MAXIMUM OPERATING FREQUENCY OF A PROCESSOR

FIELD OF THE INVENTION

The present invention relates generally to the field of processors. More particularly, the present invention relates to the field of processor operating frequency.

BACKGROUND OF THE RELATED ART

Processors are complex electrical circuits formed on a semiconductor chip. An industry has developed around designing and fabricating processors, and many research and development dollars have spurred higher performance processors. As a result, processing speed and capabilities have increased so dramatically that even similar processors may have significant variations in features and errata. Software designers design programs to operate on specific processors with specific features. Minor inconsistencies in different processors' operations might provide incorrect results or failure of a software program's operation.

Identifying the maximum operating frequency of a processor in a computer system may prevent inconsistencies between the processor, software running on it, and the generation of op-code exceptions. Identifying the processor's maximum operating frequency may equip boot up software to install custom features smoothly. Beyond initialization of the processor, identification of the processor's maximum operating frequency provides computer operators with gray market detection and deterrence. Limiting program operation to equipment that is not overclocked may eliminate economic losses from operating system failures due to overclocked parts. With this identification, computer operators may be able to detect whether a vendor has compromised quality and reliability and set a processor to overclock. In turn, the ease with which overclocking would be detected may deter vendors from setting processors to overclock.

Further, one potential methodology may be to program software to check maximum operating frequency based on each new processor model. A limitation of this methodology is that a program to verify maximum operating frequency be written in reaction to the availability of each new model of processor. Thus, this inherently backward-looking approach is constantly a step behind the introduction of each new processor. The prior art method does not provide immediate detection and deterrence. Accordingly, the need exists for system software such as an operating system, basic input/output system (BIOS), or frequency tracking tools to determine the maximum operating frequency of a particular processor in an architectural fashion and eliminate the need to update the detection mechanism for every model to provide immediate detection and deterrence from processor overclocking.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 depicts a table of one embodiment of the contents of FIG. 4's general purpose registers when the CPUID instruction is executed with given values in the EAX register.

FIG. 6 depicts a table of FIG. 6 in which a general purpose register embodies one specific implementation to identify a processor.

DETAILED DESCRIPTION OF THE INVENTION

FIGS. 1–6 of the drawings disclose various embodiments of the present invention for purposes of illustration only. One skilled in the art will readily recognize from the following discussion that alternative embodiments of the structures and methods illustrated herein may be employed without departing from the principles of the invention.

Figure 1:
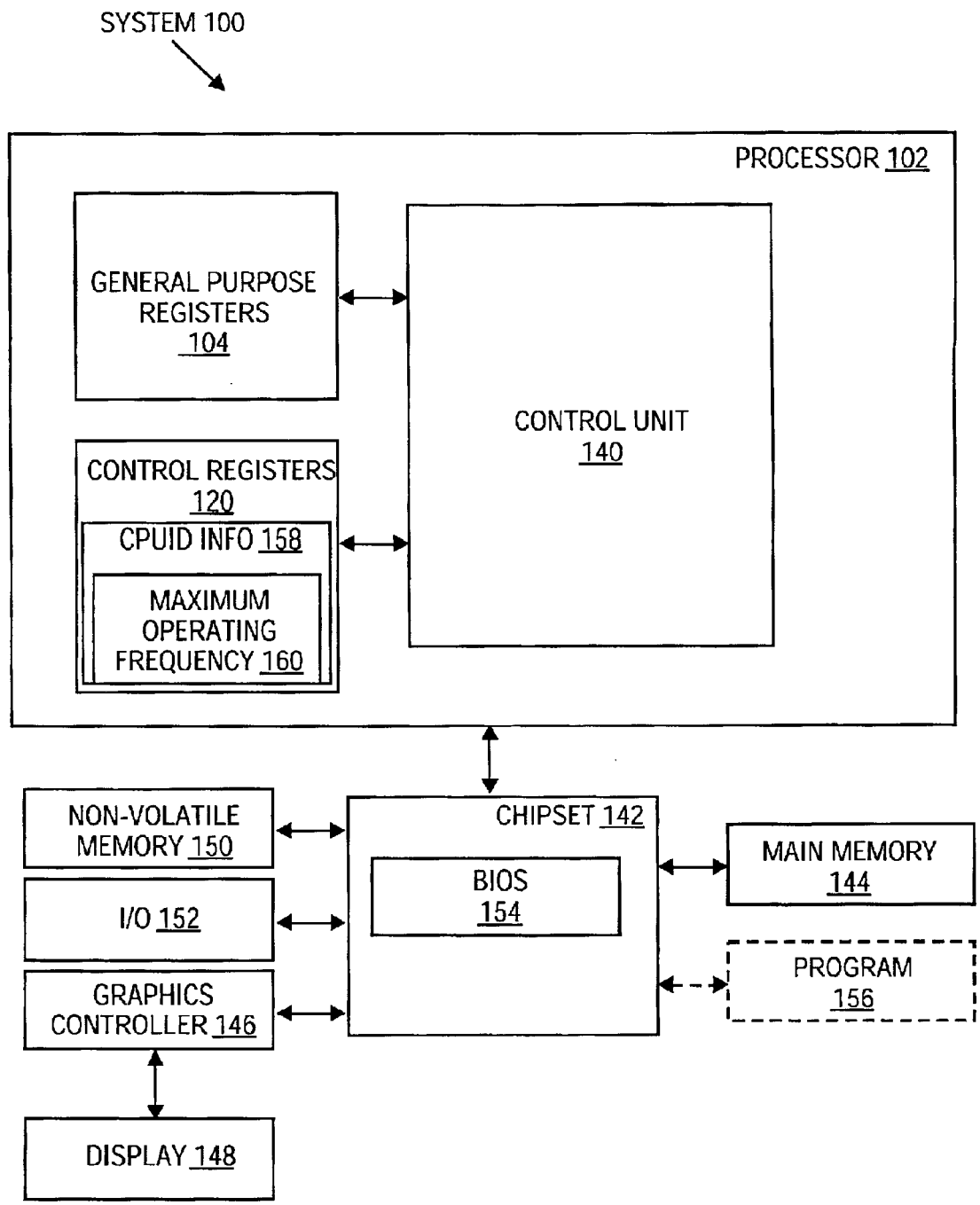
FIG. 1 illustrates an exemplary system comprising a processor to obtain the maximum operating frequency of a processor and incorporating one or more aspects of the invention.

FIG. 1 illustrates an exemplary system 100 comprising processor 102 to obtain the maximum operating frequency of a processor 102, according to embodiments of the present invention. Although described in the context of system 100, the present invention may be implemented in any suitable computer system comprising any suitable one or more integrated circuits.

Processor 102 may comprise any suitable processor architecture and for one embodiment comprise an Intel Architecture used, for example, in the Pentium® family of processors available from Intel Corporation of Santa Clara, Calif. In other embodiments, computer system 100 may comprise one or more processors, any of which may execute a set of instructions that are in accordance with embodiments of the present invention.

In one embodiment, processor 102 includes general purpose register(s) 104, control register(s) 120, and a control unit 140. Processor 102 may be coupled individually to these components. Processor 102 may also include fewer or more components or a different arrangement of the above listed components.

It may be possible, at chip manufacture, for characteristics of processor 102 to be stored in one or more control registers 120. Information to identify characteristics of the processor may be stored as Central Processing Unit Identification ("CPUID") information 158. In one embodiment, a coding for a maximum operating frequency 160 of processor 102 may be stored with the CPUID information 158 in one or more control register(s) 120. In this embodiment, the maximum operating frequency 160 is stored inside the processor 102 to provide an apparatus to identify the maximum operating frequency. The maximum operating frequency 160 may be stored in more than one control register, one or more general purpose register(s) 104, or system software, among other options.

Computer system 100 also includes chipset 142. Chipset 142 may be coupled to both processor 102 and main memory 144. Main memory 144 stores data and/or instructions, for example, for use with computer system 100. Main memory 144 may comprise any suitable memory, for example, a dynamic random access memory ("DRAM"). Graphics controller 146 controls the display of information on a suitable display 148, for example, a cathode ray tube ("CRT") or liquid crystal display ("LCD") coupled with graphics controller 146.

For one embodiment, chipset 142 provides an interface to one or more suitable non-volatile memory units 150, such as a hard disk drive ("HDD") or compact disc read/write memory ("CD ROM") drive for example, to store data and/or instructions. In one embodiment, chipset 142 also provides an interface to input/output ("I/O") 152, which may include a keyboard, mouse, one or more suitable devices, for example, a printer, through one or more parallel ports, one or more suitable devices through one or more serial ports, or a floppy disk drive.

Chipset 142 may be also coupled with and provide an interface for a Basic input/output system ("BIOS") 154. BIOS 154 may store suitable system and/or video BIOS software. BIOS 154 may comprise any suitable non-volatile memory, for example, a flash memory.

Additionally, chipset 142 may be coupled to provide an interface with a program 156. Program 156 may be a unit of computer code that provides functionality to system 100. Program 156 may also be located in chipset 142, nonvolatile memory 150, or as an attachment to I/O 152.

Figure 2:
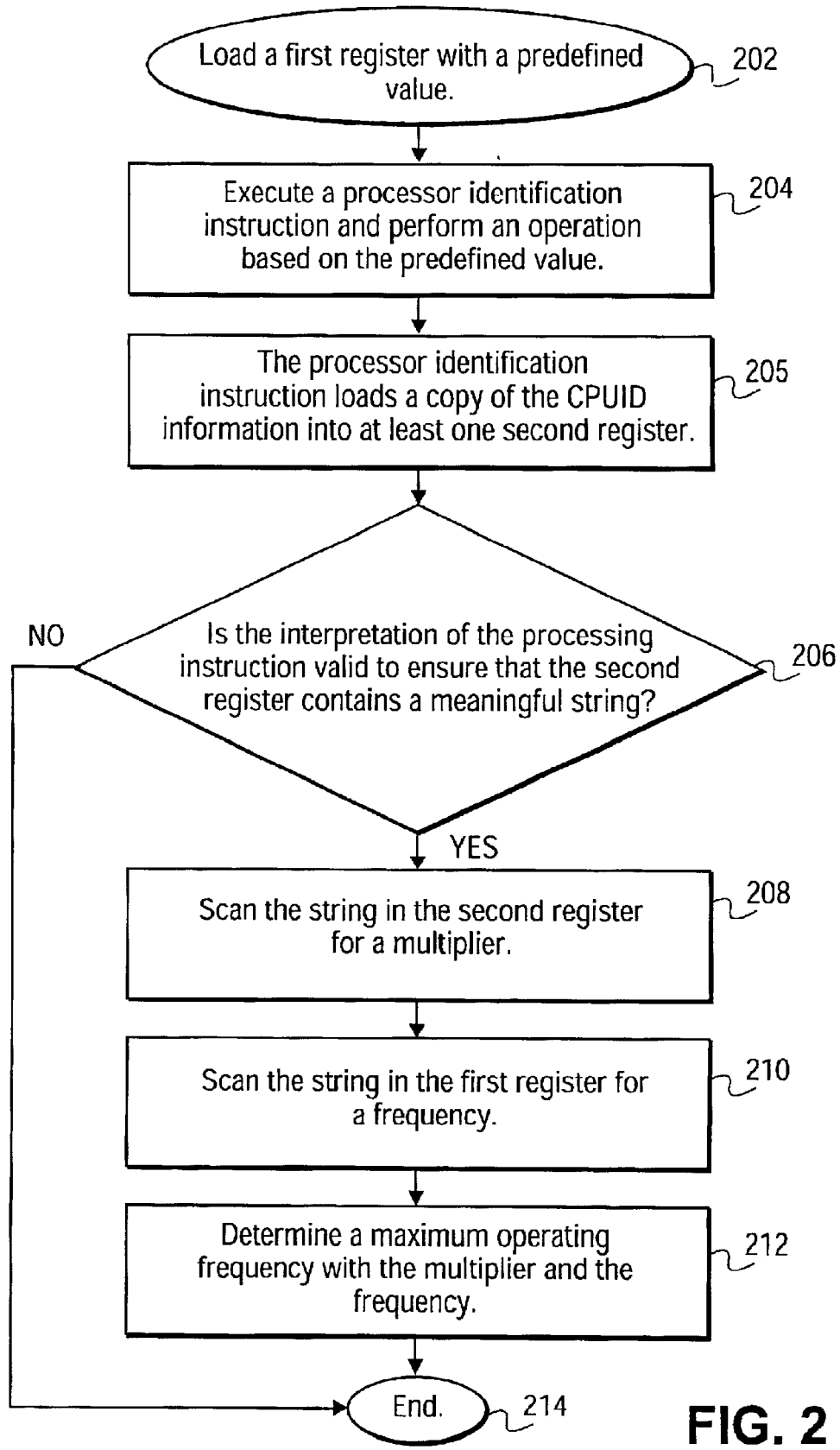
FIG. 2 is a flowchart illustrating a method of operation to determine the maximum operating frequency of a processor and incorporating one or more aspects of the invention.

FIG. 2 illustrates a flowchart 200 that exemplifies one method to determine a processor's maximum operating frequency. One embodiment includes a two-part approach: verification that the processor supports the brand string function and, if so, retrieval of the maximum operating frequency information from the brand string. Other embodiments forego the use of the brand string and derive the maximum operating frequency from any string that includes the maximum operating frequency.

One way to verify whether processor 102 supports the brand string function may use a program 156 with a processor identification instruction. Several other ways are available in other embodiments to verify brand string support, such as examination of bit patterns in the processor 102. First, in this embodiment, in block 202, program 156 loads a register, such as general purpose register 104 in FIG. 1 with a predefined value. Next, in block 204 of FIG. 2, the program 156 may execute a processor identification instruction to perform an operation based on the predefined value. Other possible embodiments may include an instruction that does not need a predefined value. In block 205 of this embodiment, the processor identification instruction loads a copy of the CPUID information 158 into one or more general purpose registers 104 in FIG. 1, or any other suitable location. Next, in block 206, the program examines one or more values to determine whether the brand string feature is supported. Brand string feature support may be denoted in a number of ways: the processor identification instruction may output a value equal to zero or a value greater than a known constant to confirm brand string support. If the brand string is not supported, then the program 156 may end. If the brand string feature is supported, then the program 156 continues to block 208.

In blocks 208–212, the program 156 determines the maximum operating frequency of processor 102, based on the brand string feature of which the processor identification instruction loaded a copy into one or more general purpose registers 104. In one possible embodiment, in block 208, the program 156 scans the brand string in reverse order for a multiplier. Other embodiments may scan the string in forward or random order, among other orders possible. After the program 156 sights the muliplier, program 156 may scan for the frequency as depicted in block 210. Blocks 208 and 210 may be switched in some embodiments because the scan for the multiplier and frequency are not order-dependent in those embodiments. In the embodiment including a brand string scan in reverse order, the program 156 may have to reverse the digits encountered to recover the number stored. Finally, block 212 shows that the program 156 may determine the maximum operating frequency based on as few as two variables, the multiplier and frequency. In one embodiment, by assigning a number based on the multiplier prefix, the program may calculate the maximum operating frequency by multiplying the assigned number and the frequency together. The final block 214 may be the end of the program in this embodiment but may entail further functions in other embodiments.

Figure 3:
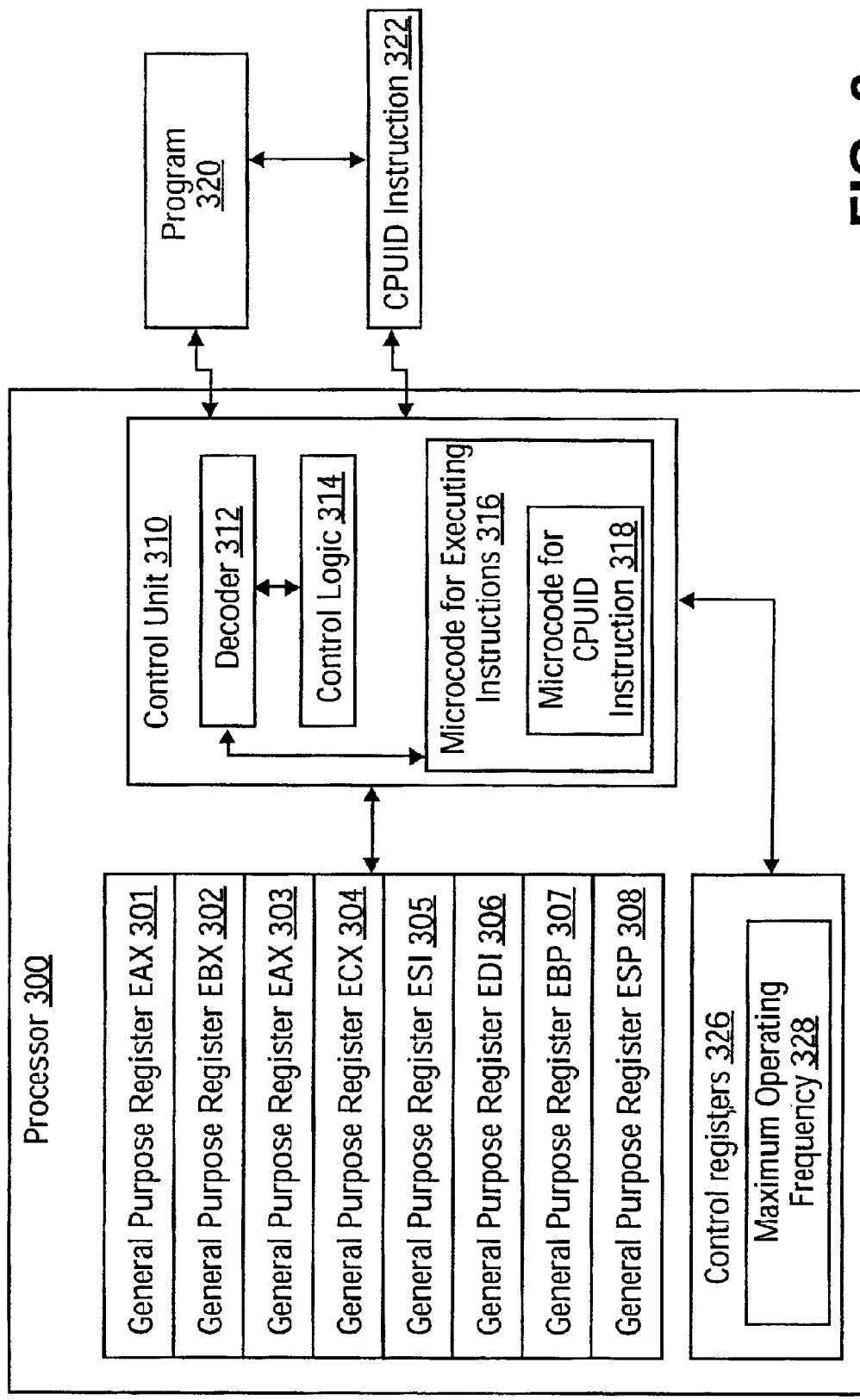
FIG. 3 illustrates a block schematic diagram of an example of a processor's architectural embodiment, incorporating one or more aspects of the invention.

In FIG. 3, a processor 300 which implements a method to identify a maximum operating frequency of a processor is shown with a software program 320 and a CPUID instruction 322. The CPUID instruction is a processing instruction that provides a processor's signature and information about the features supported and implemented on a processor. Depending on its input parameter, the CPUID instruction executes particular sets of options as is well-known in the art. Generally, processor 300 may be utilized as a (or one of several) central processing unit(s) of a computer system. It is to be noted that how the processor 300 is used is not central to the understanding of the present invention. Within processor 300 resides a plurality of general purpose ("GP") registers 301–308 and a control unit 310. Although eight GP registers 301–308 are shown, the actual number will vary according to the processor design or architecture.

The typical use of general purpose registers 301–308 within a given processor architecture is generally known in the art. The use of general purpose registers, such as registers 301–308, to manipulate information and facilitate information transfer for processor 300 are also known in the art. The general purpose registers 301–308 may be available to store operands and pointers. They may hold one or more of the following items: operands for logical and arithmetic operations, operands for address calculations, and memory pointers.

The control unit 310 includes a conventional decoder circuitry 312 to receive and decode information. It also includes control logic 314 to execute instructions supplied to it from the decoder 312. The control logic uses microcode 316 to execute instructions. In the preferred embodiment, the microcode 316 also includes instruction microcode 318 to execute a CPUID instruction, described in more detail below. In alternate embodiments, circuitry to execute the CPUID instruction may be located wholly within the control logic 314.

Generally, instructions to the decoder emanate from software routines that may be written to operate with processor 300. The design and implementation of control unit 310 and decoder 312 to decode and execute computer instructions may include generally known art.

Software that executes in the control unit 310 is illustrated as a program 320, which illustrates any of a number of programs. For example, the program 320 may include other programs that initialize the operating system, BIOS initialization software, or applications programs. The program 320 supplies instructions to the control unit 310, or alternately, it may select another program to supply instructions to the control unit 310. These programs include a CPUID instruction 322 which may be a single instruction, for example. Additional programs, not shown, may also be available.

The maximum operating frequency 328 may be accessed indirectly or directly via a processor CPUID instruction 322. The CPUID instruction 322 may be implemented in appropriate circuitry within the control unit 310 that recognizes the opcode of the CPUID instruction 322 in the decoder 312 and executes the appropriate steps in the control logic 314 to supply information in the maximum operating frequency 328 to a general purpose register 301–308 that may be visible to a user. The identification information may then be available to the programmer and manipulated by the programmer. For example, the user may read the data from the fields to ascertain which features may be appropriate to the identified processor.

In the embodiment where the ID information is stored in the processor identification register(s), such as control register(s) 326, and the microcode 316 includes the CPUID instruction microcode 318, a microcode sequence may be included therein to read the contents of control register(s) 326 and store them in a general purpose register 301–308. The microcode 318 functions to specify the registers for the CPUID instruction 322. It is to be appreciated that substantial amount of other circuitry and functional units may exist within processor 300, but are not shown in FIG. 3 since those elements are not relevant to the understanding of the present invention.

In one embodiment, the general purpose registers 301–308 of FIG. 3 may be referred to as general purpose registers EAX, EBX, ECX, EDX, ESI, EDI, EBP, and ESP. Many instructions assign specific registers to hold operands. In this embodiment, the EAX register may be used as an accumulator for operands and results data.

Figure 4:
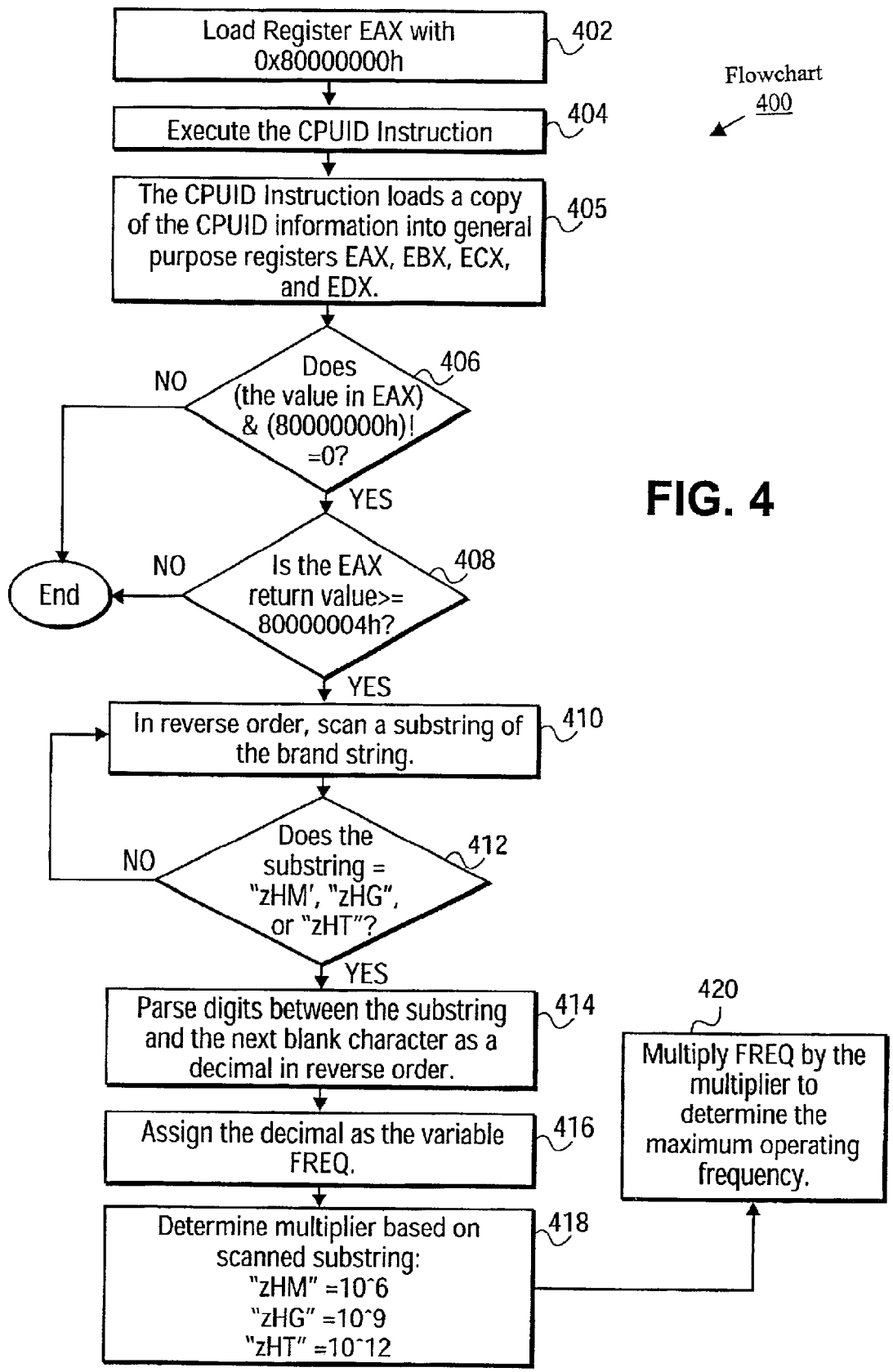
FIG. 4 illustrates a flowchart, demonstrating an example of the above embodiment of maximum operating frequency identification, incorporating one or more aspects of the invention.

FIG. 4 illustrates a flowchart 400 that exemplifies one method to determine a processor's maximum operating frequency in a specific example. This example uses the brand string feature to provide the maximum operating frequency. To verify that processor 102 supports the brand string feature, program 156 uses the CPUID instruction for its processor identification instruction. In block 402, the appropriate parameter for the CPUID instruction, 0x80000000h, may be loaded into the general purpose register EAX in FIG. 3. Next, in block 404, the program 156 executes the CPUID instruction. Based on 0x80000000h in the EAX register (see block 405) the CPUID instruction attempts to load a copy of the CPUID information 158 into registers EAX, EBX, ECX, and EDX of FIG. 3. In block 406, if the value in EAX is equal to or greater than 8000000h, then processor 102 may not support the extended CPUID and the program 156 ends. If the value in EAX is less than 8000000h, then the extended CPUID may be supported and the program 156 continues to block 408. In block 408, if the value in EAX is less than 80000004h, then processor 102 may not support the processor brand string feature. If the brand string is not supported, the program 156 may end. If the value in EAX is greater than or equal to 80000004h, then processor 102 may support the processor brand string feature. If the brand string feature is supported, then the program 156 may continue to block 410.

In block 410, the program 156 scans the brand string in reverse order for a substring of three characters to function as a multiplier. Next, in block 412, the scanned substring may be compared to the following substrings, "zHM", "zHG", and "zHT" to determine which multiplier applies to the processor's maximum operating frequency. More substrings may be added in other embodiments for larger possible multipliers. If the substring does not match one of those three, then block 410 may be revisited for the next substring, which may then be tested against the at least three options in block 412.

When a substring matches one of the at least three options in block 412, the algorithm proceeds to block 414 to parse digits between the substring and the next blank character as a decimal in reverse order. This decimal may be the frequency value without its multiplier. The decimal may be assigned the variable name FREQ in the next block 416. The variable may be chosen to be called another name. Subsequently, the multiplier may be determined according to the substring that was found in block 412. If the substring was "zHM", then the multiplier may be $10^6$. If the substring was "zHG", then the multiplier may be $10^9$. If the substring was "zHT", then the multiplier may be $10^{12}$. Finally, in block 420, the maximum operating frequency may be determined in a multiplication of the frequency from block 416 by the multiplier from block 418.

As illustrated in FIG. 5, in one embodiment, the processor identification instruction utilizes registers EAX, EBX, ECX, EDX, ESI, EDI, EBP, and ESP to output information about processor 102. In one embodiment, the CPUID instruction may output particular information when the EAX register is set to the input values in column 502. When EAX contains the value 80000000h, found in row 508 and column 502, the processor identification instruction may load EAX with the results data of the largest extended function supported as explained in row 508, column 504. On a Pentium® Processor, that value may be 80000004h as detailed in row 508, column 506. If input values 80000001h–80000004h, found in rows 512–516, all in column 502, may be loaded into EAX, then the EAX, EBX, ECX, and EDX registers may contain the brand string. The brand string may be any length as long as it may be null terminated and a processor returns valid data when CPUID instruction may be executed with EAX containing 80000002h, 80000003h, and 80000004h. This feature is further explained in FIG. 6.

FIG. 6 depicts a table, illustrating an example of the CPUID instruction execution with a processor name string based on the row 612—612, column 602 input values of 80000002h–80000004h in FIG. 5 for the EAX register in FIG. 3. In this example, the processor name string is "Intel(R) Pentium(R) 4 CPU 1400 MHz". Because the maximum operating frequency may be returned as part of the processor's name in the brand string, the maximum operating frequency may be clipped from that string into an isolated number with which to work in one possible embodiment. Based on the first input value, 8000002h, as shown in row 612, column 602, the CPUID instruction loads 0x20202020(" ") into EAX, EBX, and ECX, and 0x6E492020("nI") in EDX, respectively, as shown in row 612, column 606. The blank characters in EAX, EBX, ECX and last space in EDX represent the leading spaces for implementation simplicity in this embodiment. In other embodiments, the string may not necessarily be right justified. Based on the second input value, 80000003h, as shown in row 614, column 602, the CPUID instruction loads 0x286C6574("(let"), 0x50202952("P)R"), 0x69746E65 ("itne"), and 0x52286D75("R(mu") into EAX, EBX, ECX, and EDX, respectively. Finally, based on the third input value, 80000004h, as shown in row 616, column 602, the CPUID instruction loads 0x20342029("4)"), 0x20555043 ("UPC"), 0x30303431("0041"), 0x007A484D("\0zHM") into EAX, EBX, ECX, and EDX, respectively. In this embodiment, the frequency that may be retrieved by the algorithm in FIG. 4 is the value at the end of the string between the 'zHM' and the next blank space, in this example. Also, in this example, the 'zHM' denotes a multiplier of $10^6$.

The invention may be embodied in other specific forms without departing from its spirit or central characteristics. The described embodiment is to be considered in all respects only as illustrated and not restrictive in the scope of the invention is therefore indicated by the appended claims rather than by the foregoing description. All changes which come within the meaning and range of the equivalency of the claims are to be embraced within our scope.

What is claimed is:

1. A method comprising:
   verifying if a brand string feature is supported on a processor;
   retrieving a brand string;
   interpreting the brand string which includes information pertaining to a maximum operating frequency of the processor; and
   outputting the maximum operating frequency.

2. The method of claim 1, wherein interpreting the brand string includes scanning the brand string in reverse order for a quantity.

3. The method of claim 1, wherein verifying a brand string feature is supported on a processor is accomplished by verifying if a value loaded in a register by a processor identification instruction is greater than or equal to a selected value.

4. The method of claim 3, wherein the register is the EAX register, the processor identification instruction is the CPUID instruction, and the selected value is 80000000h.

5. A method comprising:
   loading a register with a first specified value;
   executing a processing instruction;
   verifying that the returned value in the register logically anded with a second specified value does not equal zero;
   verifying that a value the processing instruction returns is greater than or equal to a third specified value;
   scanning the string in reverse order for at least one specified substring;
   parsing the next digits as a decimal number;
   determining a multiplier value according to the specified substring;
   multiplying the decimal number by the multiplier value to output a maximum operating frequency.

6. The method of claim 5, wherein the register is one of a plurality of general purpose registers.

7. The method of claim 5, wherein the first specified value is 0x80000000.

8. The method of claim 5, wherein the specified substring is at least one of "zHM", "zHG", and "zHT".

9. A machine-readable medium that provides instructions, which when executed by a machine, causes the machine to perform operations comprising:
   verifying if a brand string feature is supported on a processor;
   retrieving a brand string;
   retrieving a maximum operating frequency of the processor from the brand string; and
   outputting the maximum operating frequency.

10. The machine-readable medium of claim 9, wherein retrieving the maximum operating frequency of the processor from the brand string includes scanning the brand string in reverse order for the maximum operating frequency.

11. The machine-readable medium of claim 9, wherein verifying if a brand string feature is supported on a processor is accomplished by verifying a value loaded in a register by a processor identification instruction is greater than or equal to a selected value.

12. A machine-readable medium that provides instructions, which when executed by a machine, causes the machine to perform operations comprising:
    loading a register with a first specified value;
    executing a processing instruction;
    verifying that the returned value in the register logically anded with a second specified value does not equal zero;
    verifying that a value the processing instruction returns is greater than or equal to a third specified value;
    scanning the string in reverse order for at least one specified substring;
    parsing the next digits as a decimal number;
    determining a multiplier value according to the specified substring;
    multiplying the decimal number by the multiplier value to output a maximum operating frequency.

13. The machine-readable medium of claim 12, wherein the register is one of a plurality of general purpose registers.

14. The machine-readable medium of claim 12, wherein the register is the EAX register.

15. The machine-readable medium of claim 12, wherein the first specified value is 0x80000000, the processing identification instruction is a CPUID instruction, and the third specified value is 80000004.

16. The machine-readable medium of claim 12, wherein the processing instruction is a processing identification instruction.

17. The machine-readable medium of claim 12, wherein the specified substring is at least one of "zHM", "zHG", and "zHT".

18. A computer comprising:
    a processor to execute a processing instruction;
    a memory element coupled to the processor;
    input and output facilities coupled to the processor;
    at least one register located within the processor, said at least one register able to contain at least one string;
    said processor to
        execute a processing instruction to interpret a numerical quantity in the at least one register;
        verify at least one processing feature is supported;
        scan the at least one string for a multiplier;
        scan the at least one string for a frequency; and
        use the multiplier and frequency to determine a maximum operating frequency.

19. The computer of claim 18, wherein the register is a general purpose register.

20. The computer of claim 18, wherein the processing instruction is a processing identification instruction.

21. The computer of claim 18, wherein the at least one string is a brand string.

22. A processor comprising:
    a first register;
    a second register to store maximum operating frequency information;
    at least one execution unit to execute instructions;
    said processor to
        execute a processing instruction to copy the maximum operating frequency information from the second register to the first register;

verify at least one feature relating to the maximum operating frequency information is supported;

scan the maximum operating frequency information in the first register for a multiplier;

scan the maximum operating frequency information in the first register for a frequency;

use the multiplier and frequency to determine a maximum operating frequency of the processor.

23. The processor of claim 22, wherein the first register is one of a plurality of general purpose registers.

24. The processor of claim 22, wherein the first register is the EAX register.

25. The processor of claim 22, wherein the second register is one of a plurality of control registers.

26. The processor of claim 22, wherein the processing instruction is a processing identification instruction.

27. The processor of claim 22, wherein the maximum operating frequency information is a brand string.

28. The processor of claim 22, wherein said processor is further able to measure a current operating frequency of the processor; and compare the maximum operating frequency to the current operating frequency.

29. The processor of claim 22, wherein the maximum operating frequency information is stored in the second register at manufacturing time.

30. The processor of claim 22, further comprising system software to store maximum operating frequency information set at manufacturing time.

* * * * *